United States Patent
Hardjono

(10) Patent No.: US 6,425,004 B1
(45) Date of Patent: Jul. 23, 2002

(54) DETECTING AND LOCATING A MISBEHAVING DEVICE IN A NETWORK DOMAIN

(75) Inventor: Thomas P. Hardjono, Arlington, MA (US)

(73) Assignee: Nortel Networks Limited, Quebec (CA)

(*) Notice: Subject to any disclaimer, the term of this patent is extended or adjusted under 35 U.S.C. 154(b) by 0 days.

(21) Appl. No.: 09/256,700

(22) Filed: Feb. 24, 1999

(51) Int. Cl.$^7$ ................................................ H04L 12/56
(52) U.S. Cl. ........................ 709/223; 380/259; 370/60
(58) Field of Search ............................... 709/201, 223, 709/224, 232, 227, 226, 228; 380/259, 283; 714/10; 370/60

(56) References Cited

U.S. PATENT DOCUMENTS 5,440,545 A * 8/1995 Buchholz et al. .............. 370/60
5,903,724 A * 5/1999 Takamoto et al. ........... 709/203

* cited by examiner

Primary Examiner—Ayaz Sheikh
Assistant Examiner—Khanh Quang
(74) Attorney, Agent, or Firm—Bromberg & Sunstein LLP

(57) ABSTRACT

A technique for detecting and locating a misbehaving router divides the network domain into multiple sectors and uses a two-level authentication scheme to allow a receiving device to authenticate that a particular packet originated in a particular sector. More specifically, an originating device includes a sector tag and a device tag in the packet. The sector tag is computed using a sector key known to all devices in the network domain, and allows any receiving device to authenticate the originating sector for the packet. The device tag is computed using a device key known only to the device and to a secure and trusted authority within the same sector. Upon receiving the packet, a receiving device authenticates the packet by computing a sector verification tag and comparing the sector verification tag to the sector tag in the packet. If the sector verification tag does not match the sector tag in the packet, then the receiving device drops the packet. If the sector verification tag matches the sector tag in the packet, but the packet includes invalid data, then the receiving device forwards the packet to a secure and trusted authority in the receiving sector. The secure and trusted authority in the receiving sector forwards the packet to other secure and trust authorities in other sectors. Each secure and trusted authority that receives the packet is able to determine whether any device in its sector is the originating device for the packet by computing device verification tags for each device in the sector and comparing the device verification tags to the device tag in the packet.

71 Claims, 7 Drawing Sheets

DETECTING AND LOCATING A MISBEHAVING DEVICE IN A NETWORK DOMAIN

FIELD OF THE INVENTION

The present invention relates generally to communication networks, and, more particularly, to detecting and locating a misbehaving device in a network domain.

BACKGROUND OF THE INVENTION

In today's information age, communication devices, such as computers and computer peripherals, are often internetworked over a data communication network. The data communication network typically includes a number of interconnected routers that enable data to be transferred from a source communication device to a destination communication device. The number of interconnected routers form a router domain within the router network.

Within a particular router domain, it is common for at least some of the routers to be interconnected with multiple neighboring routers, in what is often called a "mesh" configuration. The mesh configuration may provide multiple paths from the source communication device to the destination communication device, where each path traverses some number of routers. However, when transferring data from the source communication device to the destination communication device, it is preferable to route the data over only one path from the source communication device to the second communication device.

Therefore, in order to route information from the source communication device to the destination communication device over the data communication network, the routers must first agree on a preferred path from the source communication device to the destination communication device. The routers select the preferred path based upon routing information that is exchanged using a networking protocol, such as the Routing Information Protocol (RIP), the Open Shortest Path First (OSPF) protocol, or the Hello protocol. Each networking protocol utilizes a particular decision algorithm to select the preferred path based on a number of network parameters, including, but not limited to, the number of routers traversed by a path, the bandwidth of the communication links between routers, and the congestion level at each router, and therefore the preferred path may be different depending upon the networking protocol employed.

Thus, each router relies on the routing information it receives from the other routers in order to determine appropriate routes within the router network. Consequently, if a router receives invalid routing information, then the router may establish invalid routes that can result in performance degradation, data loss, or total failure within the router network. In order to prevent such consequences, it is preferable for each router to verify the routing information and authenticate the source of the routing information before using the routing information to establish routes. Furthermore, if a router or other network device (referred to hereinafter as a "misbehaving device") is producing and distributing invalid routing information, then it is desirable for that misbehaving device to be located so that the misbehaving device can be isolated or fixed. Therefore, a technique for locating a misbehaving device is needed.

SUMMARY OF THE INVENTION

In accordance with one aspect of the invention, a network domain of a communication network is divided into a number of sectors. Each sector includes an authenticating device, such as a secure and trusted authority (STA), as well as a number of communication devices, such as routers. A two-level authentication scheme is used to allow any of the communication devices in the network domain to determine the sector in which a misbehaving communication device is operating. The authenticating device within a sector can determine if a misbehaving communication device is within the same sector as the authenticating device.

Specifically, each sector is assigned a sector key. The sector key for each sector is distributed to all communication devices and authenticating devices. Furthermore, each communication device is assigned a device key. The device key is shared only between the device and the authenticating device within the same sector.

When an originating device in an originating sector transmits data, the originating device transmits a packet that includes at least the data, a sector tag, and a device tag. In a preferred embodiment of the present invention, the sector tag is computed using a one-way hash function based upon the data and the sector key. In a preferred embodiment of the present invention, the device tag is computed using a one-way hash function based upon the data, the sector tag, and the device key.

A receiving device in a receiving sector authenticates the originating sector for the packet by computing a-sector verification tag and comparing the sector verification tag to the sector tag in the packet. In a preferred embodiment of the present invention, the sector verification tag is computed using a one-way hash function based upon the data and the sector key. The receiving device determines the sector key by determining the originating sector for the packet, preferably using a sector key identifier included in the packet, and retrieving the sector key from a sector key table maintained by the receiving device. If the sector verification tag does not match the sector tag in the packet, then the receiving device drops the packet. If the sector verification tag matches the sector tag in the packet, then the receiving device proceeds to verify the data in the packet to determine whether the data is valid or invalid. If the data is invalid, then the packet is forwarded to one or more authenticating devices.

An authenticating device determines whether the packet originated at one of the communication devices within the same sector as the authenticating device. Specifically, in order to determine if a particular communication device is the originating device, the authenticating device computes a device verification tag using the device key corresponding to that communication device, and compares the device verification tag to the device tag in the packet. In a preferred embodiment of the present invention, the device verification tag is computed using a one-way hash function based upon the data, the sector tag, and the device key. If the device verification tag matches the device tag in the packet, then the authenticating device terminates processing of the packet, as the authenticating device successfully located the originating device. If the device verification tag does not match the device tag in the packet, then the authenticating device repeats the authentication process using the device key for another communication device in the sector. If the authenticating device fails to find a communication device within the sector that is authenticated as the originating device, then the authenticating device may forward the packet to another authenticating device in a different sector and/or notify the network administrator that there is an unidentified misbehaving communication device.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

When the router network includes a misbehaving device that generates invalid routing information, the misbehaving device can cause performance degradation, data loss, or even total failure within the router network. In order to prevent such consequences, each router in the router network should verify and authenticate the routing information it receives. Furthermore, the misbehaving device must be located so that the misbehaving device can be isolated or fixed.

A number of techniques for verifying and authenticating routing information are known. A common technique for verifying and authenticating routing information involves encrypting the routing information using a domain key that is shared by all routers in the router domain. Alternative techniques for verifying and authenticating routing information utilize public key cryptography or digital signatures. Specific protocols that utilize digital signatures for verifying and authenticating routing information are described in Murphy, S. L., and Badger, M. R., *Digital Signature Protection of OSPF Routing Protocol* (Published by ISOC in Proceedings of the 1996 Network and Distributed System Security Symposium, San Diego, 1996) and in Perlman, R., *Network Layer Protocols with Byzantine Robustness* (Published by the Massachusetts Institute of Technology, October 1988), both of which are hereby incorporated by reference in their entireties.

Figure 1:
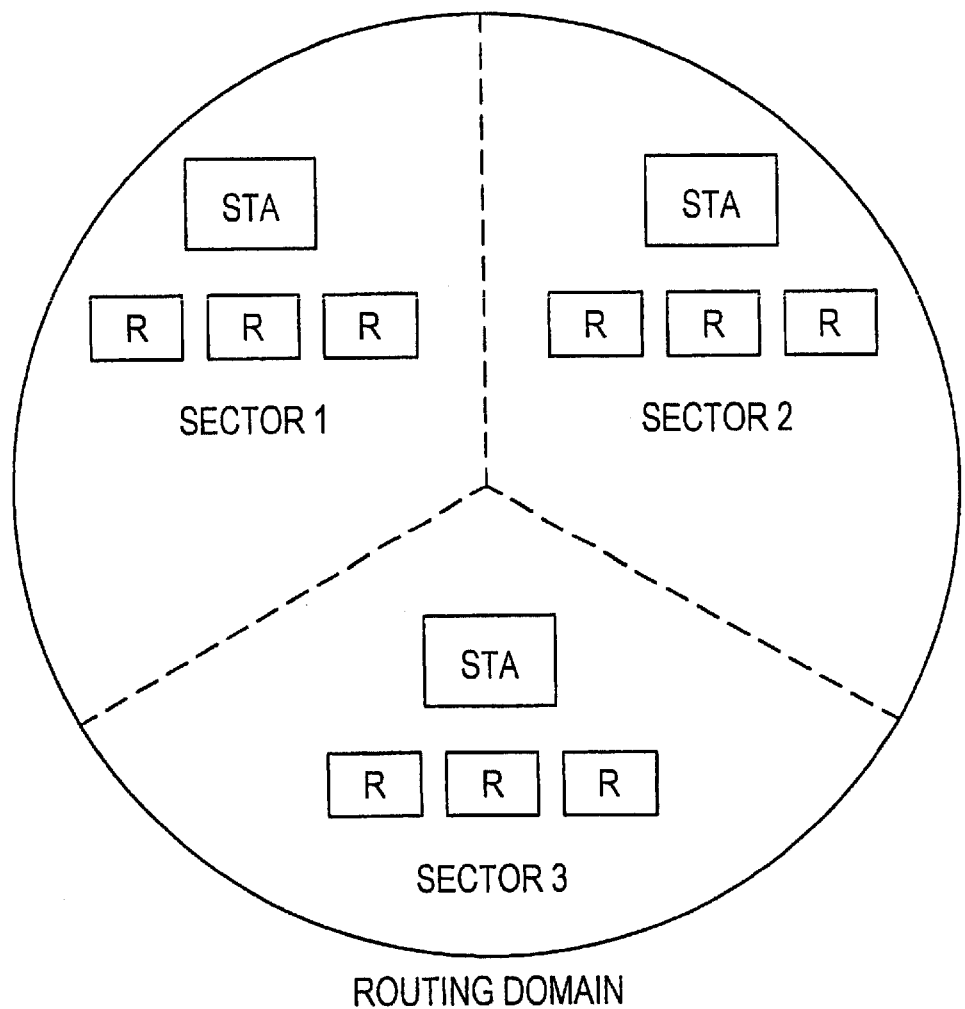
FIG. 1 is a block diagram showing an exemplary communication network divided into sectors including a secure and trusted authority and a number of routers, in accordance with a preferred embodiment of the present invention.

Unfortunately, the techniques just described are useful for verifying and authenticating the routing information, but provide little, if any, information regarding the location of a misbehaving router within the router domain. Therefore, the present invention divides the router domain into a number of sectors and utilizes a two-level authentication technique to allow any router in the router domain to determine the sector in which a misbehaving router is located. Specifically, each sector includes a number of routers as well as a secure and trusted authority (STA), as shown in FIG. 1. Each sector is associated with a sector key and a corresponding sector key identifier. The sector key and sector key identifier for each sector are distributed to all routers and STAs within the router domain, and each router maintains a key table that maps a sector key identifier to its corresponding sector key. Furthermore, each router is associated with a unique router key. The router key is shared only between a particular router and the STA within the router's sector.

In order for an originating router in an originating sector to transmit routing information to another router within the router domain (including another router within the same sector), the originating router formats a packet including, among other things, a data field, a sector tag for authenticating the originating sector for the packet, and a router tag for authenticating the originating router.

Figure 2:
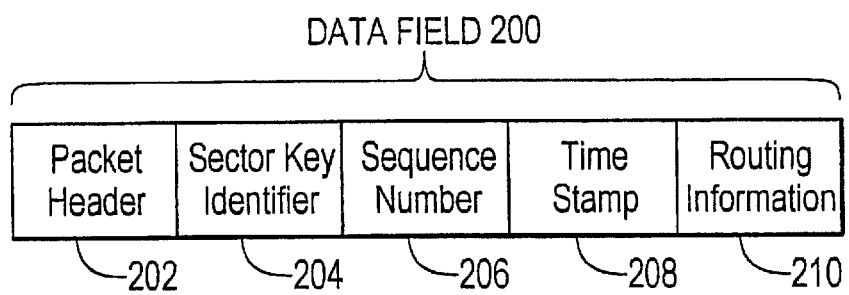
FIG. 2 is a block diagram showing the format of an exemplary data field in accordance with a preferred embodiment of the present invention.

FIG. 2 shows the format of a preferred data field 200 in accordance with a preferred embodiment of the present invention. As shown in FIG. 2, the preferred data field 200 includes a packet header 202, the sector key identifier 204 corresponding to the originating sector, a sequence number 206, a time stamp 208, and the routing information 210. The routing information 210 may be encrypted or may include additional information allowing the receiving router to verify the integrity of the routing information.

Figure 3:
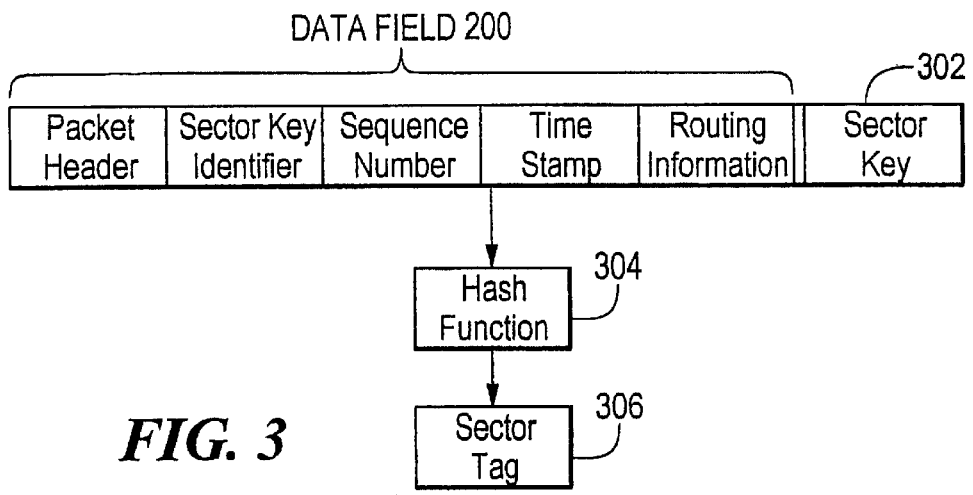
FIG. 3 is a block diagram showing the computation of a sector tag in accordance with a preferred embodiment of the present invention.

In a preferred embodiment of the present invention, the sector tag is computed using a one-way hash function based upon the data field and the sector key, as shown in FIG. 3. Specifically, the data field 200 and the sector key 302 are provided as inputs to the hash function 304. The hash function 304 adds pad bytes, if necessary, and applies a one-way hash function to obtain the sector tag 306.

Figure 4:
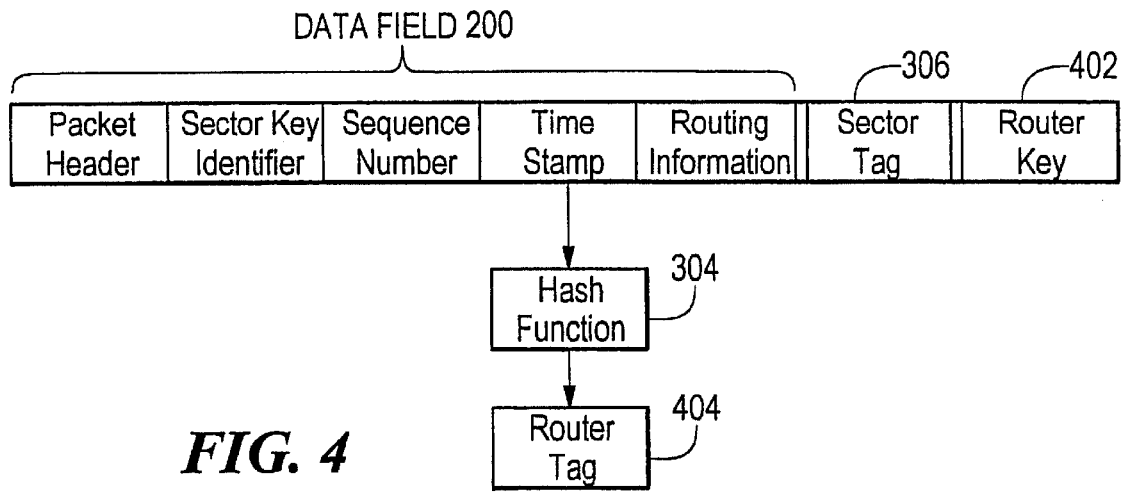
FIG. 4 is a block diagram showing the computation of a router tag in accordance with a preferred embodiment of the present invention.

In a preferred embodiment of the present invention, the router tag is computed using a one-way hash function based upon the data field, the sector tag, and the router key, as shown in FIG. 4. Specifically, the data field 200, the sector tag 306, and the router key 402 are provided as inputs to the hash function 304. The hash function 304 adds pad bytes, if necessary, and applies a one-way hash function to obtain the router tag 404.

Figure 5:
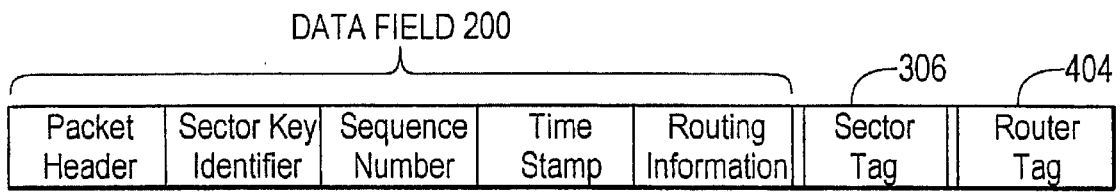
FIG. 5 is a block diagram showing the format of an exemplary packet in accordance with a preferred embodiment of the present invention.

FIG. 5 shows the format of the packet produced by the originating router. As described above, the packet includes the data field 200, the sector tag 306, and the router tag 404. The sector tag 306 enables a receiving router to authenticate the originating sector of the packet, as described in greater detail below. The router tag 404 enables an STA to determine whether or not the packet originated from a router within the STA's router domain, as described in greater detail below.

Figure 6:
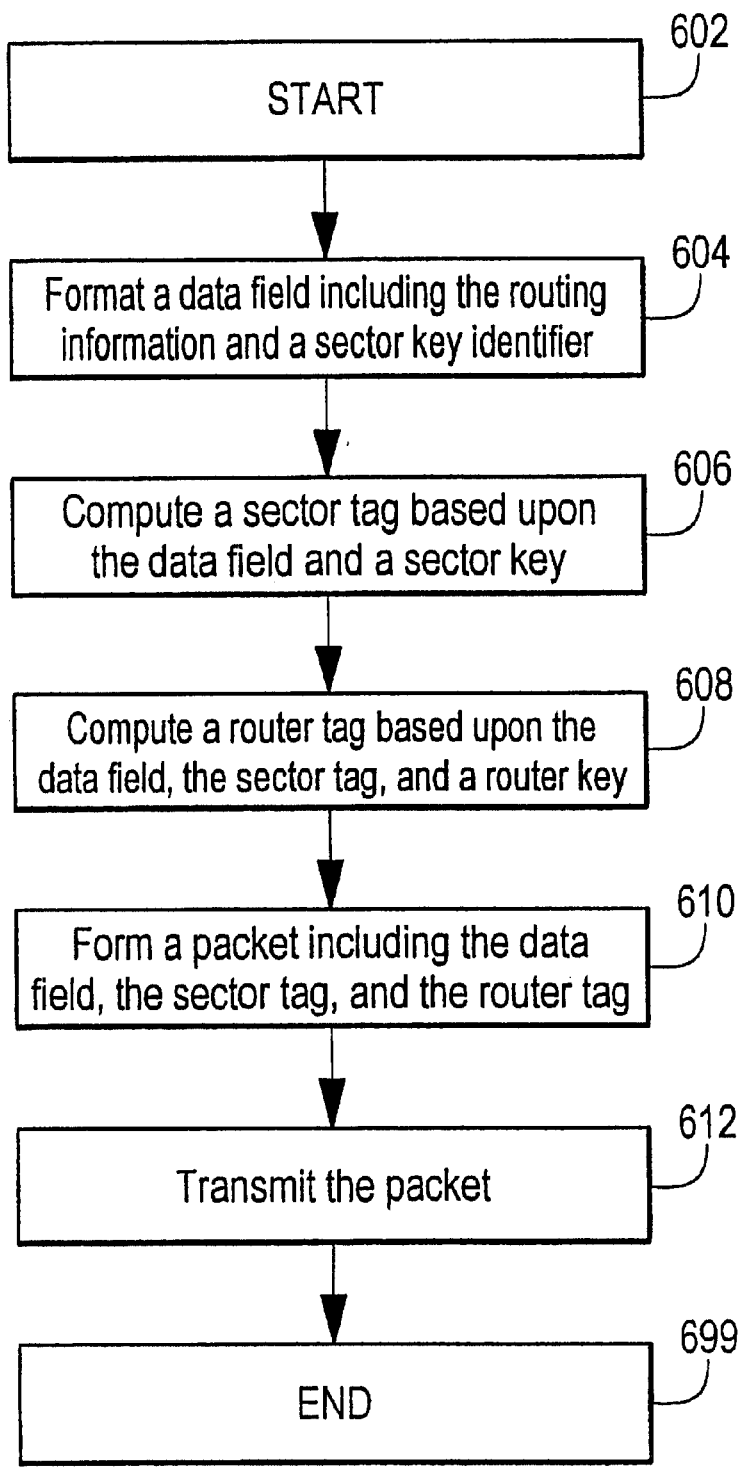
FIG. 6 is a logic flow diagram showing exemplary originating router logic for transmitting a packet in accordance with a preferred embodiment of the present invention.

FIG. 6 is a logic flow diagram showing exemplary logic for transmitting routing information by an originating router. After beginning in step 602, the originating router formats the data field 200 including the routing information and the sector key identifier, in step 604. The originating router then computes the sector tag 306 based upon the data field 200 and the sector key 302, in step 606. The originating router then computes the router tag 404 based upon the data field 200, the sector tag 306, and the router key 402, in step 608. The originating router proceeds to form the packet including the data field 200, the sector tag 306, and the router tag 404, in step 610, and transmit the packet, in step 610. The logic terminates in step 699.

Upon receiving the packet, the receiving router in the receiving sector authenticates the packet by verifying the sector tag 306 in the packet. Specifically, the receiving router determines the sector key 302 for the packet based upon the sector key identifier 204 in the data field 200, and computes a sector verification tag based upon the data field 200 and the sector key 302. The receiving router then compares the sector verification tag. to the sector tag 306 in the packet. If the sector verification tag matches the sector tag 306, then the receiving router continues processing the packet (described below). However, if the sector verification tag does not match the sector tag 306, then the receiving router drops the packet.

Assuming that the sector verification tag matches the sector tag 306, then the receiving router verifies the integrity of the routing information 210 in the data field 200. This may involve, for example, verifying that the routing information 210 is consistent with other routing information received by the receiving router, decrypting the routing information 210, and/or authenticating the routing information 210 using authentication information contained in the routing information 210. If the receiving router determines that the routing information 210 is invalid, then the receiving router forwards the packet to the STA within the receiving sector. The STA takes additional steps to identify the specific originating router, as described in detail below.

Figure 7:
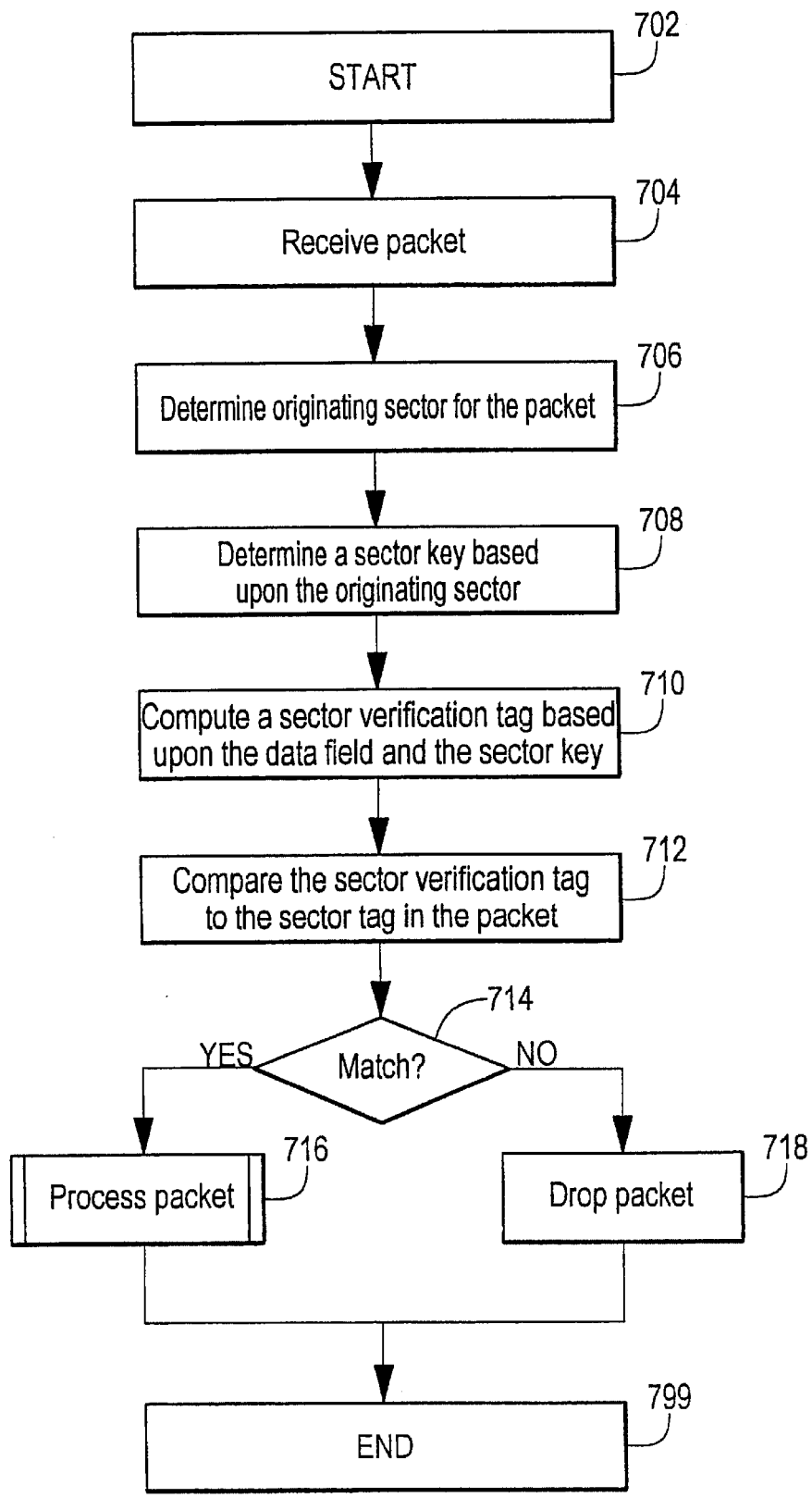
FIG. 7 is a logic flow diagram showing exemplary receiving router logic for authenticating a received packet in accordance with a preferred embodiment of the present invention.

FIG. 7 is a logic flow diagram showing exemplary logic for processing a packet by a receiving router in a receiving sector. The receiving router begins in step 702, and upon receiving the packet in step 704, proceeds to determine the originating sector for the packet, in step 706. In a preferred embodiment of the present invention, the receiving router determines the originating sector for the packet based upon the sector key identifier 204 in the data field 200. The receiving router then determines the sector key 302. in step 708, preferably by using the sector key identifier 204 to retrieve the sector key 302 from the key table maintained by the receiving router. The receiving router then computes a sector verification tag based upon the data field 200 and the sector key 302, in step 710, and compares the sector verification tag to the sector tag 306 in the packet, in step 712. If the sector verification tag matches the sector tag 306 (YES in step 714), then the receiving router continues on to process the packet, in step 716. However, if the sector verification tag does not match the sector tag 306 (NO in step 714), then the receiving router drops the packet. The logic terminates in step 799.

Figure 8:
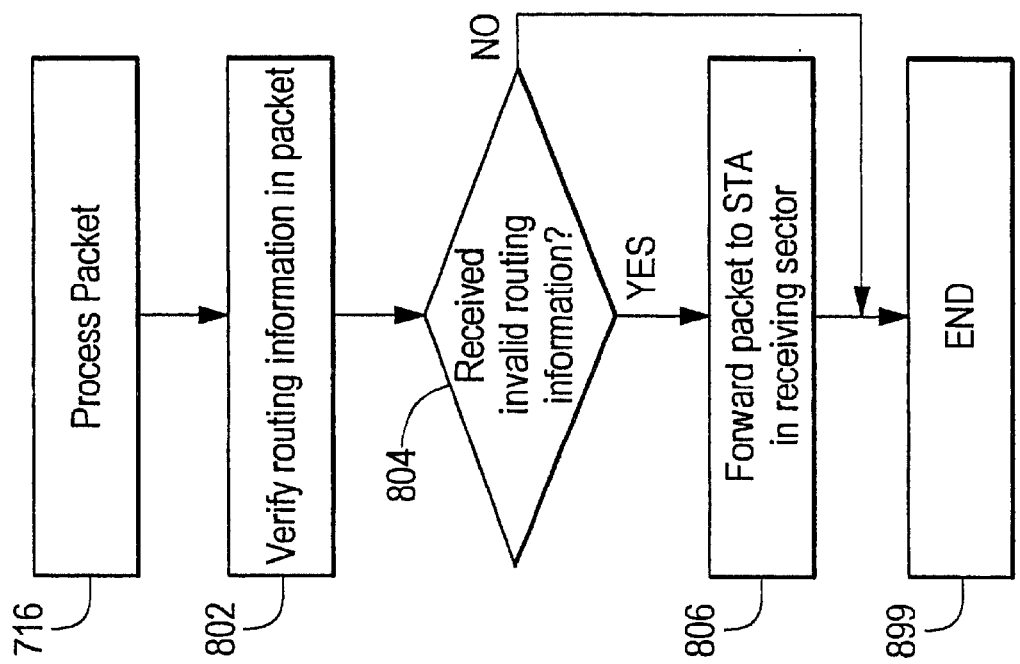
FIG. 8 is a logic flow diagram showing exemplary receiving router logic for forwarding an invalid packet to a secure and trusted authority within the receiving sector in accordance with a preferred embodiment of the present invention.

FIG. 8 is a logic flow diagram showing exemplary logic for processing the packet in step 716. After successfully authenticating the originating sector for the packet, the receiving router verifies the routing information 210 in the packet, in step 802. As described above, this may involve, for example, verifying that the routing information 210 is consistent with other routing information received by the receiving router, decrypting the routing information 210, and/or authenticating the routing information 210 using authentication information contained in the routing information 210. If the receiving router determines that the routing information 210 is invalid (YES in step 804), then the receiving router forwards the packet to the STA within the receiving sector, in step 806. The STA takes additional steps to identify the specific originating router, as described in detail below. The logic terminates in step 899.

When the STA in the receiving sector receives the packet from the receiving router, the STA preferably forwards the packet to the STA in the originating sector. Therefore, the STA in the receiving sector first determines the originating sector for the packet, preferably based upon the sector key identifier 204 in the data field 200. The STA in the receiving sector then forwards the packet to the STA in the originating sector (unless, of course, the receiving sector is the same as the originating sector, in which case the STA in the receiving sector continues processing the packet as described below).

Figure 9:
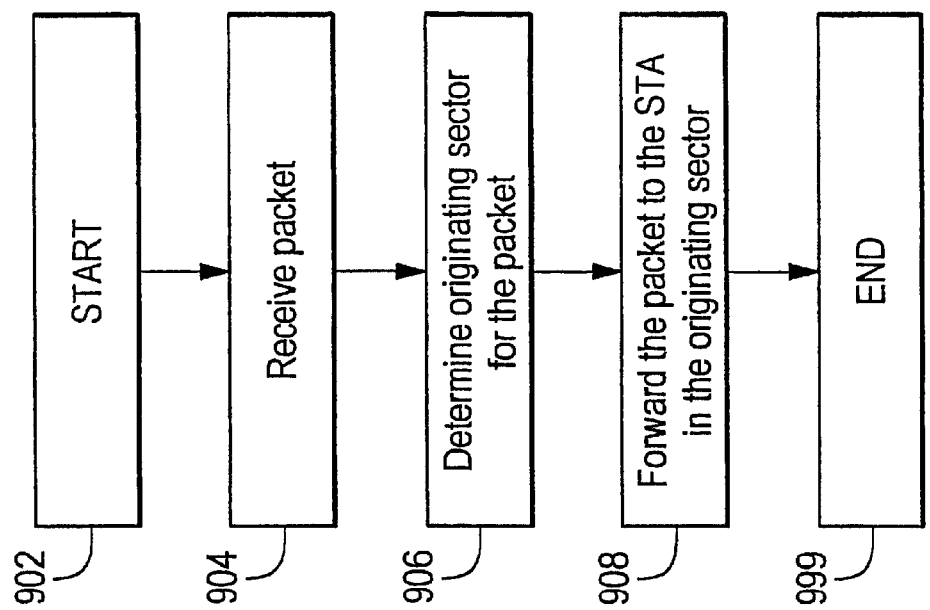
FIG. 9 is a logic flow diagram showing exemplary logic for forwarding an invalid packet by a secure and trusted authority in the receiving sector to a secure and trusted authority in the originating sector in accordance with a preferred embodiment of the present invention.

FIG. 9 is a logic flow diagram showing exemplary logic for processing the packet by the STA in the receiving sector. The STA begins in step 902, and upon receiving the packet in step 904, proceeds to determine the originating sector for the packet, in step 906. In a preferred embodiment of the present invention, the receiving router determines the originating sector for the packet based upon the sector key identifier 204 in the data field 200. The STA then forwards the packet to the STA in the originating sector, in step 908, and terminates in step 999.

When the STA in the originating sector receives the packet (either from the STA in the receiving sector, if the receiving sector is different than the originating sector, or from the receiving router, if the receiving sector is the same as the originating sector), the STA tries to identify the misbehaving router. Because the receiving router authenticated that the packet originated in the originating sector, it is probable that the packet did originate within the originating sector and that the misbehaving router is therefore within the originating sector. However, it is possible that the misbehaving router is actually in another sector and is sending invalid information that appears to be sector-authentic. This could happen, for example, if the misbehaving router has been compromised by an intruder or "hacker," or if there is a misconfiguration within the router network.

Therefore, the STA attempts to authenticate the packet by verifying the router tag 404 in the packet. Specifically, the STA uses the router keys for the routers within the STA's sector to determine whether one of the routers within the STA's sector is the originating router. In order to determine whether a particular router is the originating router, the STA determines the router key for the router, and computes a router verification tag for the packet based upon the data field 200, the sector tag 306, and the router key. The STA then compares the router verification tag to the router tag 404 in the packet. If the router verification tag matches the router tag 404, then the STA has successfully identified the originating router. However, if the router verification tag does not match the router tag 404, then the STA repeats the same process for another router within the STA's sector. If none of the routers within the STA's sector is authenticated as the originating router, then the STA may forward the packet to other STAs, which in turn perform the same set of steps to determine whether any of the routers in their respective sectors is the originating router for the packet. The STAs may also notify a network administrator that there is an unidentified misbehaving router.

Figure 10:
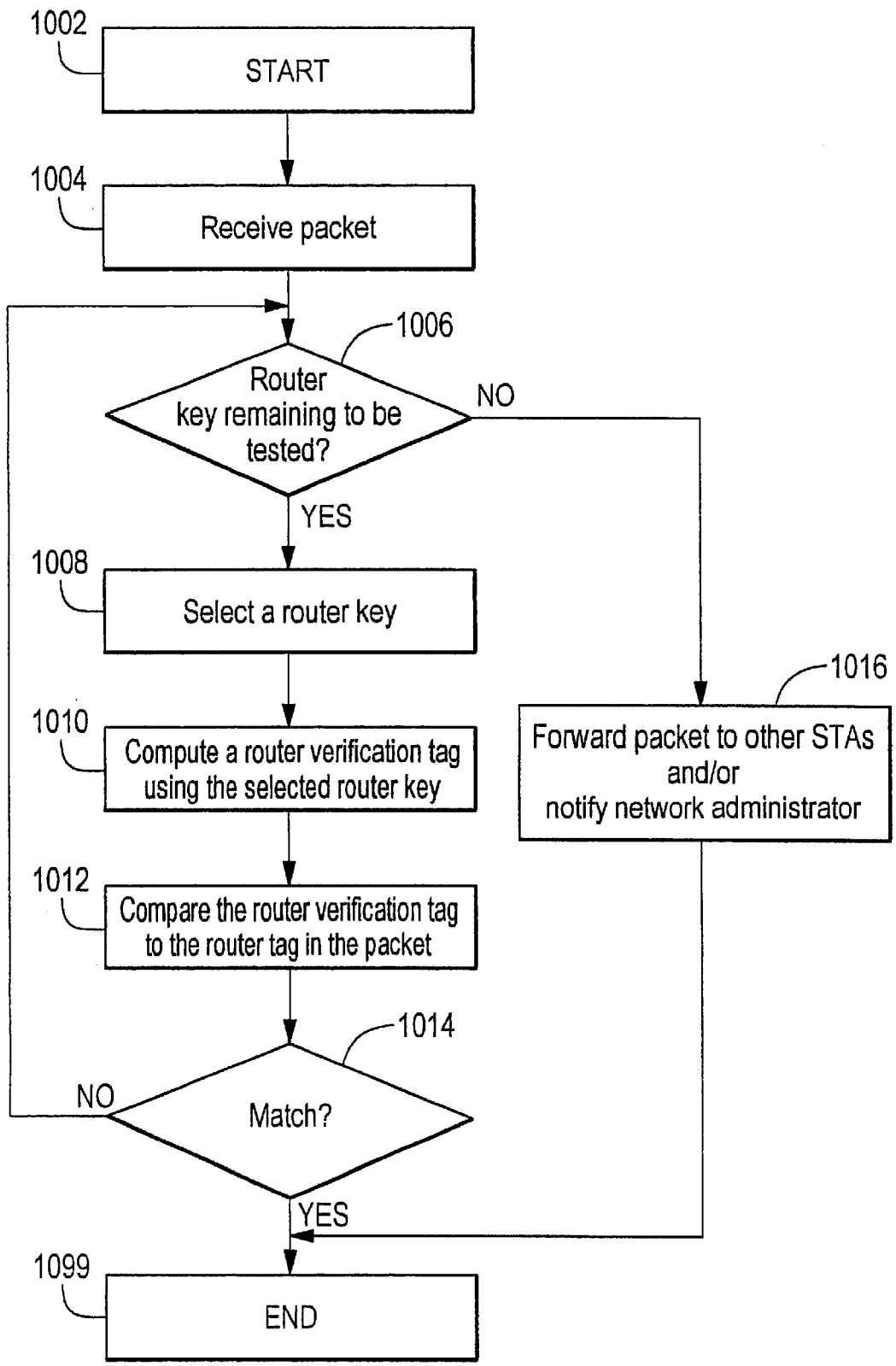
FIG. 10 is a logic flow diagram showing exemplary logic for determining, by a secure and trusted authority, whether a router in the same sector as the secure and trust authority is the originating router for the packet in accordance with a preferred embodiment of the present invention.

FIG. 10 is a logic flow diagram showing exemplary STA logic for determining whether a packet was originated by a router within the STA's sector. The STA begins in step 1002, and upon receiving the packet in step 1004, determines whether there is at least one router key remaining to be tested, in step 1006. If there is at least one router key remaining to be tested (YES in step 1006), then the STA selects a router key 402, in step 1008, and computes a router verification tag, preferably based upon the data field 200, the sector tag 306, and the router key 402, in step 1010. The STA then compares the router verification tag to the router tag 404 in the packet, in step 1012. If the router verification tag matches the router tag 404 (YES in step 1014), then the STA has successfully identified the originating router. However, if the router verification tag does not match the router tag 404 (NO in step 1014), then the STA recycles to step 1006 and repeats the same process for another router. If there are no router keys remaining to be tested (NO in step 1006), then the STA may forward the packet to other STAs or notify a network administrator that there is an inidentified misbehaving router, in step 1016. The logic terminates in step 1099.

Figure 11:
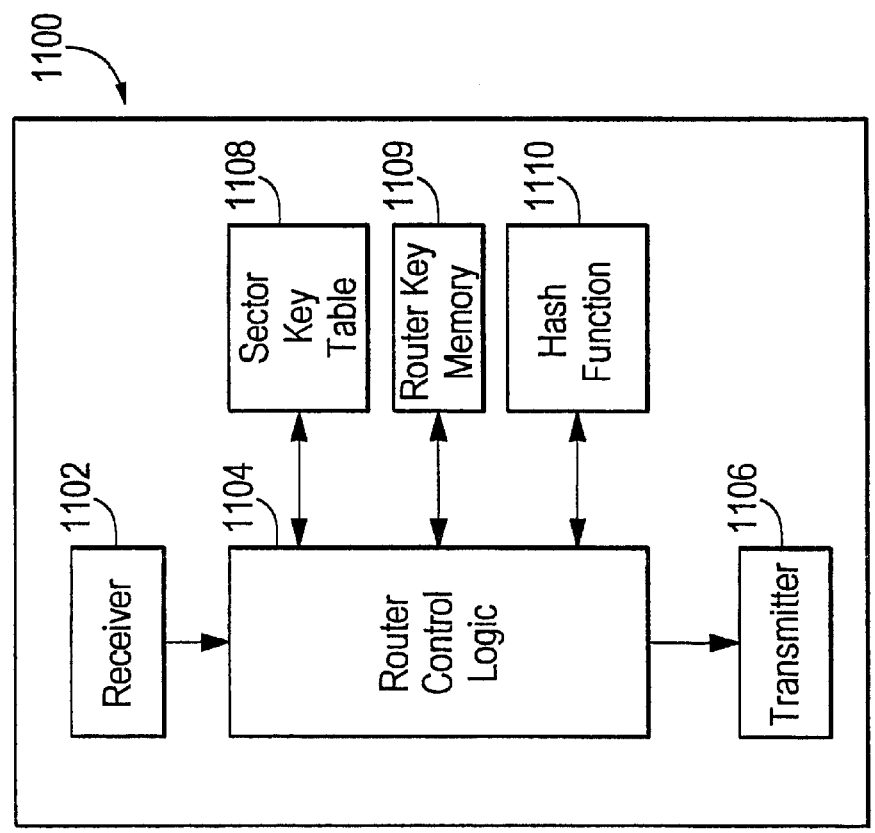
FIG. 11 is a block diagram showing an exemplary router in accordance with a preferred embodiment of the present invention.

FIG. 11 is a block diagram showing an exemplary router 100 in accordance with a preferred embodiment of the present invention. The router 1100 includes receiver 1102, router control logic 1104, transmitter 1106, sector key table 1108, router key memory 1109, and hash function 1110.

In an originating router, the router control logic 1104 performs the logic shown and described with reference to FIG. 6. The router control logic 1104 retrieves the sector key and sector key identifier from the sector key table 1108, and retrieves the router key from the router key memory 1109. The router control logic 1104 then formats the data field including the routing information and the sector key identifier. The router control logic 1104 provides the data field and the sector key as inputs to the hash function 1110, which computes the sector tag and returns the sector tag to the router control logic 1104. The router control logic 1104 then provides the data field, the sector tag, and the router key as inputs to the hash function 110, which computes the router tag and returns the router tag to the router control logic 1104. The router control logic 1104 then forms the packet including the data field, the sector tag, and the router tag, and transmit the packet via the transmitter 1106.

In a receiving router, the router control logic 1104 performs the logic shown and described with reference to FIGS. 7 and 8. Upon receiving a packet via the receiver 1102, the router control logic 1104 determines the originating sector for the packet based upon the sector key identifier in the packet. The router control logic 1104 then uses the sector key identifier to retrieve the corresponding sector key from the sector key table 1108. The router control logic 1104 then provides the data field and the sector key as inputs to the hash function 1110, which computes the sector verification tag and returns the sector verification tag to the router control logic 1104. The router control logic 1104 compares the sector verification tag to the sector tag in the packet to determine whether to drop the packet or continue processing the packet. Upon determining that the sector verification tag does not match the sector tag in the packet, the router control logic 1104 drops the packet. Upon determining that the sector verification tag matches the sector tag in the packet, the router control logic 1104 continues processing the packet by first verifying the routing information in the packet. Upon determining that the routing information is invalid, the router control logic 1104 forwards the packet to the STA within the same sector via the transmitter 1106.

Figure 12:
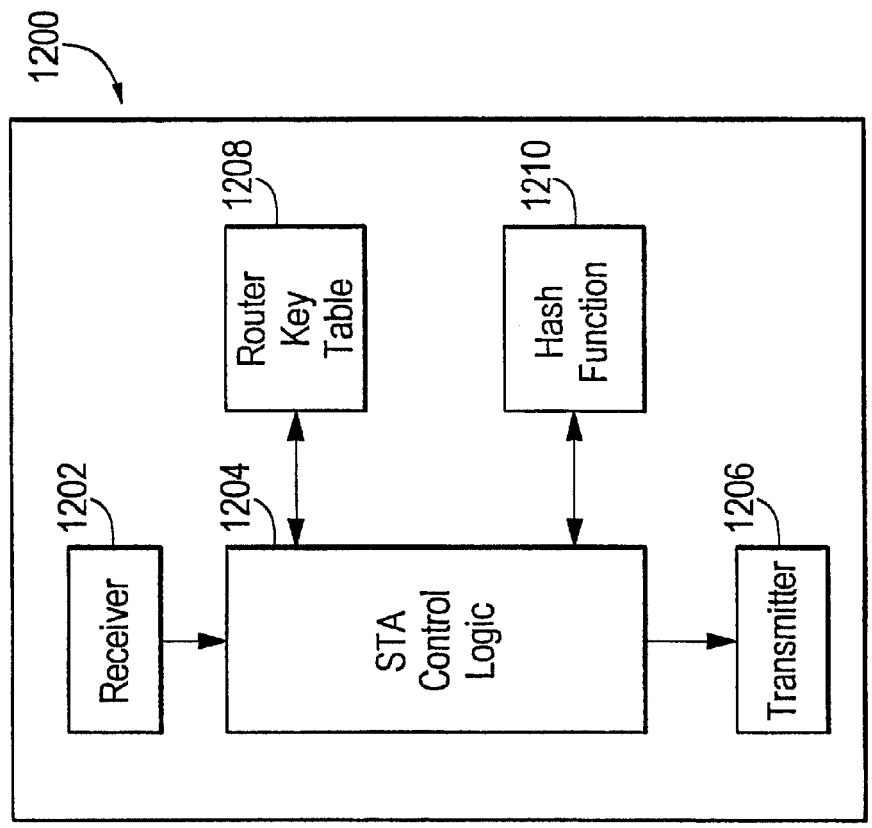
FIG. 12 is a block diagram showing an exemplary secure and trusted authority in accordance with a preferred embodiment of the present invention.

FIG. 12 is a block diagram showing an exemplary STA 1200 in accordance with a preferred embodiment of the present invention. The STA 1200 includes receiver 1202, STA control logic 1204, transmitter 1206, router key table 1208, and hash function 1210.

In order to determine whether the originating router for a packet is one of the routers in the STA's sector, the STA control logic 1204 performs the logic shown and described with reference to FIG. 10. Upon receiving the packet via the receiver 1202; the STA control logic 1204 attempts to identify one router in the STA's sector as the originating router for the packet. In order to test whether a particular router is the originating router for the packet, the STA control logic 1204 retrieves the corresponding router key from the router key table 1208. The STA control logic 1204 then provides the data field, the sector tag, and the router key as inputs to the hash function 1210, which computes the router verification tag and returns the router verification tag to the STA control logic 1204. The STA control logic 1204 then compares the router verification tag to the router tag in the packet. Upon determining that the router verification tag matches the router tag in the packet, the STA control logic 1204 terminates processing of the packet, having successfully identified the originating router for the packet. Upon determining that the router verification tag does not match the router tag, the STA control logic 1204 tests a next router in the STA's sector. Upon testing all routers in the STA's sector and failing to identify one of the routes as the originating router for the packet, the STA control logic 1204 may forward the packet to other STAs or notify the network administrator that there is an unidentified misbehaving router.

It should be noted that the present invention is in no way limited to detecting and locating a misbehaving router that transmits routing information in a router domain. The techniques of the present invention are applicable generically to detecting and locating a misbehaving device that transmits data within a network domain of a communication network. The data can include any type of information, including, but in no way limited to, routing information.

Specifically, an originating device in an originating sector of the network domain transmits data by computing a sector tag based upon the data and a sector key, computing a device tag based upon at least the data and a device key (although preferably also based upon the sector tag), forming a packet including the data as well as the sector tag and the device tag, and transmitting the packet.

A receiving device in a receiving sector of the network domain maintains a sector key for each sector in the network domain. The receiving device processes the packet by determining a sector key for the packet, computing a sector verification tag based upon the data and the sector key, and authenticating the packet by comparing the sector verification tag to the sector tag in the packet. The receiving device drops the packet if the sector verification tag does not match the sector tag in the packet. The receiving device continues processing the packet if the sector verification tag matches the sector tag in the packet.

In order to determine the location of the originating device, the receiving device forwards the packet to an STA within the receiving sector. The STA determines the originating sector for the packet. If the receiving sector is different than the originating sector, then the STA forwards the packet to an STA in the originating sector. However, if the receiving sector is the same as the originating sector, then the STA processes the packet locally.

When the STA in the originating sector receives the packet (either from the STA in the receiving sector, if the receiving sector is different than the originating sector, or from the receiving device, if the receiving sector is the same as the originating sector), the STA tries to identify the misbehaving device. In order to determine whether a particular device is the originating device, the STA determines the device key for the device, and computes a device verification tag for the packet based upon the data, the sector tag, and the device key. The STA then compares the device verification tag to the device tag in the packet. If the device verification tag matches the device tag, then the STA has successfully identified the originating device. However, if the device verification tag does not match the device tag, then the STA repeats the same process for another device within the STA's sector. If none of the device within the STA's sector is authenticated as the originating device, then the STA may forward the packet to other STAs or notify a network administrator that there is an inidentified misbehaving device.

It should also be noted that the present invention is not limited to the use of a one-way hash function for generating tags. Numerous alternative techniques for generating the sector and device tags may be substituted for the one-way hash functions. For example, the tags may be computed using a "keyed" hash function, in which the key (i.e., the sector key or the router key) is passed as a separate input to the hash function in lieu of, or in addition to, including the key along with the data to be hashed. Also, the tags may be computed using symmetric cryptography, public key cryptography, or digital signature techniques, to name only a few.

In a preferred embodiment of the present invention, predominantly all of the router control logic 1104 and the hash function 1110 is implemented as a set of computer program instructions that are stored in a computer readable medium and executed by an embedded microprocessor system within the router 1100. Also, in a preferred embodiment of the present invention, predominantly all of the STA control logic 1204 and hash function 1210 is implemented as a set of computer program instructions that are stored in a computer readable medium and executed by an embedded microprocessor system within the STA 1200. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A method for transmitting data by an originating device in an originating sector of a network domain, the method comprising the steps of:

maintaining a sector key associated with the originating sector of the network domain;

maintaining a sector key identifier associated with the originating sector of the network domain;

maintaining a unique device key;

computing a sector tag based upon the data and the sector key;

computing a device tag based upon at least the data and the device key;

forming a packet including at least the data, the sector tag, and the device tag; and transmitting the packet.

2. The method of claim 1, wherein the data includes the sector key identifier.

3. The method of claim 1, wherein the packet includes the sector key identifier.

4. The method of claim 1, wherein the step of computing the sector tag comprises calculating a hash value based upon the data and the sector key.

5. The method of claim 1, wherein the step of computing the device tag comprises calculating a hash value based upon the data and the device key.

6. The method of claim 1, wherein the step of computing the device tag comprises calculating a hash value based upon the data, the sector tag, and the device key.

7. An originating device for transmitting data in an originating sector of a network domain, the originating device comprising:

sector tag computation logic operably coupled to compute a sector tag based upon the data and a sector key;

device tag computation logic operably coupled to compute a device tag based upon at least the data and a device key; and packet transmitting logic operably coupled to transmit a packet including at least the data, the sector tag, and the device tag.

8. The originating device of claim 7, wherein the device tag computation logic computes the device tag based upon the data, the sector tag, and the device key.

9. The originating device of claim 7, further comprising hash function logic operably coupled to the sector tag computation logic and the device tag computation logic.

10. The originating device of claim 9, wherein the sector tag computation logic provides the data and the sector key as inputs to the hash function logic, and wherein the hash function logic computes the sector tag and returns the sector tag to the sector tag computation logic.

11. The originating device of claim 9, wherein the device tag computation logic provides at least the data and the device key as inputs to the hash function logic, and wherein the hash function logic computes the device tag and returns the device tag to the device tag computation logic.

12. The originating device of claim 11, wherein the device tag computation logic provides the data, the sector tag, and the device key as inputs to the hash function logic, and wherein the hash function logic computes the device tag and returns the device tag to the device tag computation logic.

13. The originating device of claim 7, wherein the originating device is a router, and wherein the data includes routing information.

14. The originating device of claim 13, wherein the data further includes a sector key identifier corresponding to the sector key.

15. A program product comprising a computer readable medium having embodied therein a computer readable program for transmitting data by an originating device in an originating sector of a network domain, the computer readable program comprising:
   sector tag computation logic programmed to compute a sector tag based upon the data and a sector key;
   device tag computation logic programmed to compute a device tag based upon at least the data and a device key; and
   packet transmitting logic programmed to transmit a packet including at least the data, the sector tag, and the device tag.

16. The program product of claim 15, wherein the device tag computation logic is programmed to compute the device tag based upon the data, the sector tag, and the device key.

17. The program product of claim 15, further comprising hash function logic programmed to compute a tag based upon a number of inputs.

18. The program product of claim 17, wherein the sector tag computation logic is programmed to provide the data and the sector key as inputs to the hash function logic, and wherein the hash function logic is programmed to compute the sector tag and return the sector tag to the sector tag computation logic.

19. The program product of claim 17, wherein the device tag computation logic is programmed to provide at least the data and the device key as inputs to the hash function logic, and wherein the hash function logic is programmed to compute the device tag and return the device tag to the device tag computation logic.

20. The program product of claim 19, wherein the device tag computation logic is programmed to provide the data, the sector tag, and the device key as inputs to the hash function logic, and wherein the hash function logic is programmed to compute the device tag and return the device tag to the device tag computation logic.

21. The program product of claim 15, comprising:
   computer readable program code means for computing a sector tag based upon the data and a sector key;
   computer readable program code means for computing a device tag based upon at least the data and a device key; and
   computer readable program code means for transmitting a packet including at least the data, the sector tag, and the device tag.

22. A method for processing a packet by a receiving device in a receiving sector of a network domain, the method comprising the steps of:
   receiving a packet including at least data and a sector tag corresponding to an originating sector of the network domain; and
   determining whether to accept or drop the packet based upon at least the sector tag in the packet, wherein the step of determining whether to accept or drop the routing information packet comprises the steps of:
   maintaining a sector key associated with the originating sector of the network domain;
   computing a sector verification tag based upon the data and the sector key; and
   comparing the sector verification tag to the sector tag in the packet.

23. The method of claim 22, wherein the step of computing the sector verification tag comprises calculating a hash value based upon the data and the sector key.

24. The method of claim 22, wherein the packet includes a sector key identifier associated with the originating sector of the network domain, and wherein the step of determining whether to accept or drop the routing information packet comprises the steps of:
   maintaining a sector key for each of a number of sectors of the network domain;
   selecting a sector key associated with the originating sector of the network domain based upon the sector key identifier in the packet;
   computing the sector verification tag based upon the data and the sector key associated with the originating sector of the network domain; and
   comparing the sector verification tag to the sector tag in the packet.

25. The method of claim 22, further comprising the step of dropping the packet, if the sector verification tag does not match the sector tag in the packet.

26. The method of claim 22, further comprising the step of verifying the data to determine whether the data is valid or invalid, if the sector verification tag matches the sector tag in the packet.

27. The method of claim 22, further comprising the step of forwarding the packet to an authenticating device within the receiving sector of the network domain, if the data is determined to be invalid.

28. A receiving device for processing a packet received in a receiving sector of a network domain, the device comprising:
   packet receiving logic operably coupled to receive a packet including at least data and a sector tag;
   sector key determination logic operably coupled to determine a sector key for the packet;

tag computation logic operably coupled to compute a sector verification tag based upon the data and the sector key; and sector authentication logic operably coupled to compare the sector verification tag to the sector tag in the received packet.

29. The receiving device of claim 28, further comprising a sector key table operably coupled to the sector key determination logic, the sector key table storing a sector key for each of a number of sectors in the network domain.

30. The receiving device of claim 29, wherein the sector key determination logic comprises:

sector determination logic operably coupled to determine an originating sector for the packet; and sector key retrieval logic responsive to the sector determination logic and operably coupled to retrieve the sector key from the sector key table based upon the originating sector for the packet.

31. The receiving device of claim 30, wherein the packet includes a sector key identifier corresponding to the originating sector for the packet, and wherein the sector determination logic is operably coupled to determine the originating sector for the packet based upon the sector key identifier.

32. The receiving device of claim 28, further comprising hash function logic operably coupled to the tag computation logic.

33. The receiving device of claim 32, wherein the tag computation logic provides the data and the sector key as inputs to the hash function logic, and wherein the hash function logic computes the sector verification tag and returns the sector verification tag to the tag computation logic.

34. The receiving device of claim 28, further comprising packet verification logic responsive to the sector authentication logic and operably coupled to determine whether the data is valid or invalid.

35. The receiving device of claim 34, further comprising packet forwarding logic responsive to the packet verification logic and operably coupled to forward the packet to an authenticating device within the receiving sector, if the packet verification logic determines that the data is invalid.

36. The receiving device of claim 28, wherein the receiving device is a router, and wherein the data includes routing information.

37. A program product comprising a computer readable medium having embodied therein a computer readable program for processing a packet received by a receiving device in a receiving sector of a network domain, the computer readable program comprising:

packet receiving logic programmed to receive a packet including at least data, and a sector tag;

sector key determination logic programmed to determine a sector key for the packet;

tag computation logic programmed to compute a sector verification tag based upon the data and the sector key; and sector authentication logic programmed to compare the sector verification tag to the sector tag in the received packet.

38. The receiving device of claim 37, wherein the sector key determination logic comprises:

sector determination logic programmed to determine an originating sector for the packet; and sector key retrieval logic programmed to retrieve the sector key from a sector key table based upon the originating sector for the packet.

39. The program product of claim 38, wherein the packet includes a sector key identifier corresponding to the originating sector for the packet, and wherein the sector determination logic is programmed to determine the originating sector for the packet based upon the sector key identifier.

40. The program product of claim 37, further comprising hash function logic programmed to compute a tag based upon a number of inputs.

41. The program product of claim 40, wherein the tag computation logic is programmed to provide the data and the sector key as inputs to the hash function logic, and wherein the hash function logic is programmed to compute the sector verification tag and return the sector verification tag to the tag computation logic.

42. The program product of claim 37, further comprising packet verification logic responsive to the sector authentication logic and programmed to determine whether the data is valid or invalid.

43. The program product of claim 42, further comprising packet forwarding logic responsive to the packet verification logic and programmed to forward the packet to an authenticating device within the receiving sector, if the packet verification logic determines that the data is invalid.

44. The program product of claim 37, comprising:

computer readable program code means for receiving a packet including at least data and a sector tag;

computer readable program code means for determining a sector key for the packet;

computer readable program code means for computing a sector verification tag based upon the data and the sector key; and computer readable program code means for comparing the sector verification tag to the sector tag in the received packet.

45. A method for determining whether an originating device for a packet is located within a sector of a network domain, the method comprising the steps of:

maintaining a number of device keys, each device key corresponding to a device in the sector of the network domain;

receiving the packet including at least data and a device tag corresponding to the originating device of the packet;

selecting an untested device key from among the number of device keys;

computing a device verification tag based upon at least the data and the selected device key;

comparing the device verification tag to the device tag in the packet; and determining that the originating device is located within the sector of the network domain, if the device verification tag matches the device tag in the packet.

46. The method of claim 45, wherein the step of computing the device verification tag comprises calculating a hash value based upon at least the data and the selected device key.

47. The method of claim 46, wherein the packet further includes a sector tag corresponding to an originating sector of the network domain, and wherein the step of computing the device verification tag comprises calculating a hash value based upon the data, the sector tag, and the selected device key.

48. The method of claim 45, further comprising repeating the steps of selecting a device key from among the number of device keys, computing a device verification tag based upon at least the data and the selected device key, and comparing the device verification tag to the device tag in the packet, if the device verification tag does not match the device tag in the packet.

49. The method of claim 48, further comprising the step of determining that the originating device is not located within the sector of the network domain.

50. The method of claim 49, further comprising the step of forwarding the packet to an authenticating device in another sector of the network domain upon determining that the originating device is not located within the sector of the network domain.

51. An authenticating device for authenticating a packet in a sector of a network domain, the device comprising:
    packet receiving logic operably coupled to receive a packet including at least data and a device tag;
    tag computation logic operably coupled to compute a device verification tag based upon at least the data and a device key; and
    device authentication logic operably coupled to compare the device verification tag to the device tag in the packet.

52. The authenticating device of claim 51, further comprising:
    a device key table for storing a unique device key for each of a number of devices in the sector of the network domain; and
    device key retrieval logic operably coupled to retrieve the device key from the device key table.

53. The authenticating device of claim 51, further comprising hash function logic operably coupled to the tag computation logic.

54. The authenticating device of claim 53, wherein the tag computation logic provides at least the data and the device key as inputs to the hash function logic, and wherein the hash function logic computes the device verification tag and returns the device verification tag to the tag computation logic.

55. The authenticating device of claim 54, wherein the packet further includes a sector tag corresponding to an originating sector of the network domain.

56. The authenticating device of claim 55, wherein the tag computation logic provides the data, the sector tag, and the device key as inputs to the hash function logic, and wherein the hash function logic computes the device verification tag and returns the device verification tag to the tag computation logic.

57. The authenticating device of claim 51, further comprising logic for reiterating the tag computation logic and device authentication logic using a different device key.

58. The authenticating device of claim 51, further comprising packet forwarding logic operably coupled to forward the packet to another authenticating device in a different sector of the network domain.

59. The authenticating device of claim 51, wherein the authenticating device is a secure and trusted authority within the sector of the network domain.

60. A program product comprising a computer readable medium having embodied therein a computer readable program for authenticating a packet in a sector of a network domain, the computer readable program comprising:
    packet receiving logic programmed to receive a packet including at least data and a device tag;
    tag computation logic programmed to compute a device verification tag based upon at least the data and a device key; and
    device authentication logic programmed to compare the device verification tag to the device tag in the packet.

61. The program product of claim 60, further comprising:
    device key retrieval logic programmed to retrieve the device key from a device key table.

62. The program product of claim 60, further comprising hash function logic programmed to compute a tag based upon a number of inputs.

63. The program product of claim 62, wherein the tag computation logic is programmed to provide at least the data and the device key as inputs to the hash function logic, and wherein the hash function logic is programmed to compute the device verification tag and return the device verification tag to the tag computation logic.

64. The program product of claim 63, wherein the packet further includes a sector tag corresponding to an originating sector of the network domain.

65. The program product of claim 64, wherein the tag computation logic is programmed to provide the data, the sector tag, and the device key as inputs to the hash function logic, and wherein the hash function logic is programmed to compute the device verification tag and return the device verification tag to the tag computation logic.

66. The program product of claim 60, further comprising computer readable program code means for reiterating the tag computation logic and device authentication logic using a different device key.

67. The program product of claim 60, further comprising packet forwarding logic programmed to forward the packet to another authenticating device in a different sector of the network domain.

68. The program product of claim 60, comprising:
    computer readable program code means for receiving a packet including at least data and a device tag;
    computer readable program code means for computing a device verification tag based upon at least the data and a device key; and
    computer readable program code means for comparing the device verification tag to the device tag in the packet.

69. The program product of claim 68, wherein the packet further includes a sector tag, and wherein the computer readable program code means for computing the device verification tag comprises computer readable program code means for computing the device verification tag based upon the data, the sector tag, and the device key.

70. A communication system comprising an originating device in an originating sector of a network domain, a receiving device in a receiving sector of the network domain, and an authenticating device within the network domain, wherein:

the originating device transmits a packet including a sector tag computed using a sector key and a device tag computed using a device key;

the receiving device authenticates the originating sector for the packet by computing a sector verification tag based upon the sector key and determining whether the sector verification tag matches the sector tag in the packet; and the authenticating device determines whether the originating device for the packet is within the same sector as the authenticating device by computing a device verification tag using a one of a number of device keys maintained by the authenticating device and determining whether the device verification tag matches the device tag in the packet.

71. A method for processing a packet by a secure and trusted authority in a receiving sector of a network domain, the method comprising the steps of:

receiving from a receiving device in the receiving sector of the network domain a packet including at least data, a sector tag corresponding to an originating sector of the network domain, and a sector key identifier associated with the originating sector of the network domain; and forwarding the packet to at least one secure and trusted authority in another sector of the network domain, wherein the step of forwarding the packet comprises determining the original sector for the packet and forwarding the packet to a secure and trusted authority in the originating sector of the network domain, and wherein the step of determining the originating sector for the packet comprises using the sector key identifier in the packet to identify the original sector.

* * * * *